United States Patent [19]

Yashima

[11] Patent Number: 4,463,269
[45] Date of Patent: Jul. 31, 1984

[54] PUMP DRIVE CIRCUIT

[75] Inventor: Hiroyuki Yashima, Tokyo, Japan

[73] Assignee: Olympus Optical Co., Ltd., Tokyo, Japan

[21] Appl. No.: 437,370

[22] Filed: Oct. 28, 1982

[30] Foreign Application Priority Data

Nov. 2, 1981 [JP] Japan .................... 56-176235
Nov. 4, 1981 [JP] Japan .................... 56-176916

[51] Int. Cl.³ .................... H02J 13/00; G05F 5/00
[52] U.S. Cl. .................... 307/129; 307/140; 323/242; 323/300; 323/324; 323/326; 417/42
[58] Field of Search ............ 307/127, 129, 130, 140, 307/141, 252 B; 318/345 C, 807, 809; 323/239, 242, 244, 300, 324, 326; 417/42

[56] References Cited

U.S. PATENT DOCUMENTS

| 4,311,956 | 1/1982 | Tolmie, Jr. ............ 323/326 X |
| 4,370,563 | 1/1983 | Vondling et al. ........ 307/129 X |
| 4,382,223 | 5/1983 | Hedges ................ 323/244 X |

FOREIGN PATENT DOCUMENTS 54-98168 8/1979 Japan .

Primary Examiner—E. A. Goldberg
Assistant Examiner—Derek Jennings
Attorney, Agent, or Firm—Frishauf, Holtz, Goodman and Woodward

[57] ABSTRACT

In a pump drive circuit, a power source voltage signal supplied to the pump is phase-controlled by a triac connected between the pump and the power source. The period of triggering the triac is determined by a time constant circuit of a UJT, a capacitor and a resistor circuit. The power source voltage signal has its frequency determined by a frequency discrimination circuit. The resistance value of the resistor circuit is selected in accordance with the result of the discrimination. Accordingly, the pump is applied with a voltage signal the phase of which is controlled in accordance with the power source frequency, and is thus driven to maintain a predetermined output.

9 Claims, 24 Drawing Figures

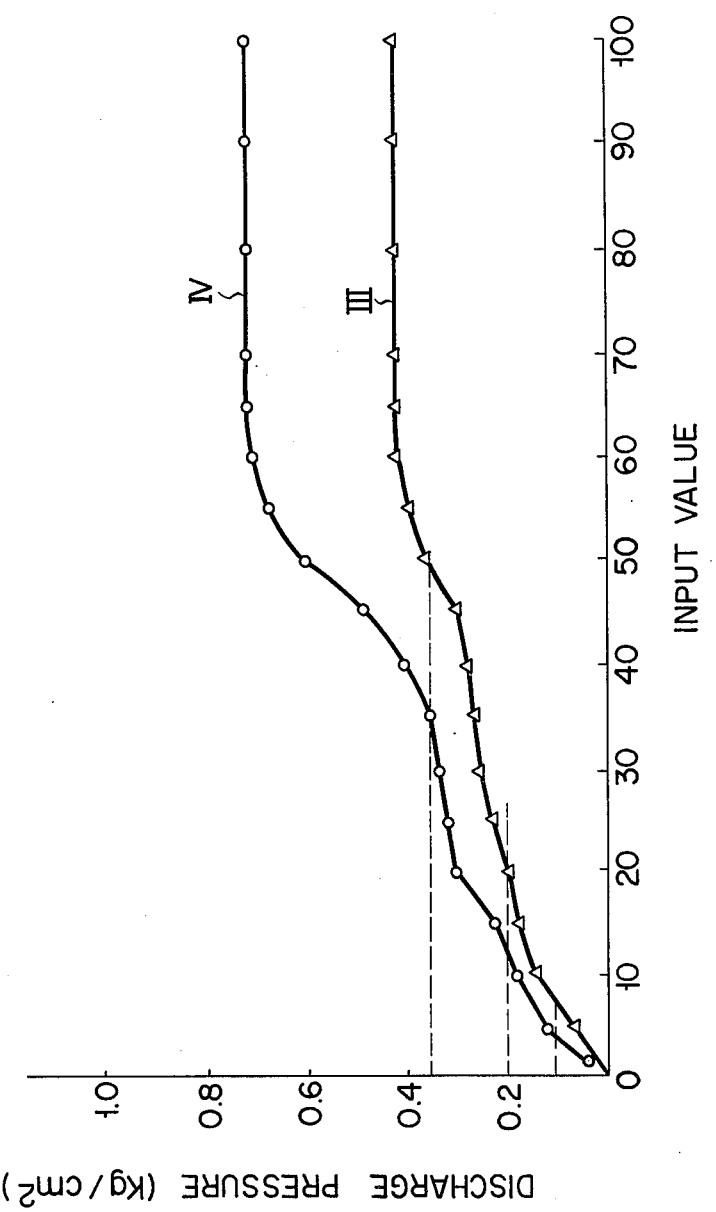

DISCHARGE PRESSURE (Kg/cm²)

| SETTING VALUE | MEASUREMENT VALUE | |
|---|---|---|
| | 50Hz | 60Hz |
| A  0.35 | 0.34 | 0.36 |
| B  0.20 | 0.21 | 0.20 |
| C  0.10 | 0.11 | 0.11 |

PUMP DRIVE CIRCUIT

BACKGROUND OF THE INVENTION

This invention relates to a pump drive circuit, and more particularly to a pump drive circuit which can control the driving of a pump by controlling the phase of a voltage supplied to the pump.

There is known a conventional pump drive circuit for driving a pump through control of voltage phase angle. However, this type of pump drive circuit has the problem that, when the power source has a frequency of 50 Hz or 60 Hz, controlling the voltage supply at even the same phase fails to produce the same flow rate of air or water. The closer the pump comes to a state of being driven at full power, the greater the difference between the pump outputs resulting from the difference in frequency, and thus, the more significant the problem. With respect especially to a pump drive circuit involved in the air or water supply (or as a suction device) of an endoscope, a fine adjustment of flow rate is demanded, which makes it necessary to remove any difference in pump outputs attributable to a difference in frequency.

SUMMARY OF THE INVENTION

Accordingly, an object of the present invention is to provide a pump drive circuit which can always maintain the pump output at a desired level even when the power source frequency is varied.

According to the invention, there is provided a pump drive circuit comprising:

means for detecting the zerocross point of a power source voltage supplied to a pump to generate a zerocross signal;

means for discriminating the frequency of the power source voltage by the zerocross signal;

means for selecting a time constant in accordance with a discrimination signal from said discrimination means; and means for controlling the phase of the power source voltage applied to said pump in accordance with the selected time constant, a voltage of predetermined phase being supplied to said pump from said phase control means.

BRIEF DESCRIPTION OF THE DRAWINGS

FIG. 10 is a graph showing the relation between the pump controlled output and the set input values;

DETAILED DESCRIPTION OF THE PREFERRED EMBODIMENT

Figure 1:
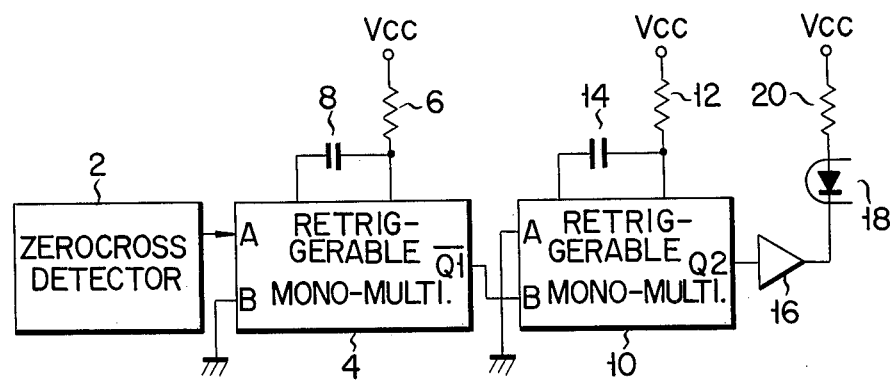
FIG. 1 is a block circuit diagram showing a power source frequency discrimination circuit to be incorporated in a pump drive circuit according to an embodiment of the invention.

In FIG. 1, there is shown an example of a frequency discrimination circuit provided in a pump drive circuit of the invention. The discrimination circuit is provided with a zerocross detection circuit 2 for detecting the zerocross point of an alternating voltage, wherein the output of the circuit is connected to one input terminal A of a first retriggerable monomultivibrator 4. The other input terminal B of the monomultivibrator is grounded. Between the retriggerable monomultivibrator 4 and a power source $V_{CC}$, there are connected a first resistor 6 and a capacitor 8 which form a circuit for determining a time constant. A second retriggerable monomultivibrator 10 has two input terminals, A and B. Terminal A is grounded and terminal B is connected to the output terminal $\overline{Q1}$ of said first retriggerable monomultivibrator 4. The first resistor 6 and capacitor 8 externally coupled to the first retriggerable monomultivibrator 4 are so chosen that the first retriggerable monomultivibrator 4 may generate a pulse having a pulse width smaller than a half cycle of the 50 Hz frequency signal, and greater than a half cycle of the 60 Hz frequency signal. Between the second retriggerable monomultivibrator 10 and a power source $V_{CC}$, there are connected a second resistor 12 and a capacitor 14 which constitute a circuit for determining another time constant. The second retriggerable monomultivibrator 10 has an inversion output terminal $\overline{Q2}$ connected to a buffer 16 of open collector type. The externally added second resistor 12 and capacitor 14 are so selectively determined that the second retriggerable monomultivibrator 10 may generate a pulse having a pulse width greater than a half cycle of the 50 Hz frequency signal. The monomultivibrator 10 produces an output signal from its output terminal. The output of the buffer 16 is connected to a power source $V_{CC}$ through a light emitting diode of a photocoupler 18 and a resistor 20.

Figure 2:
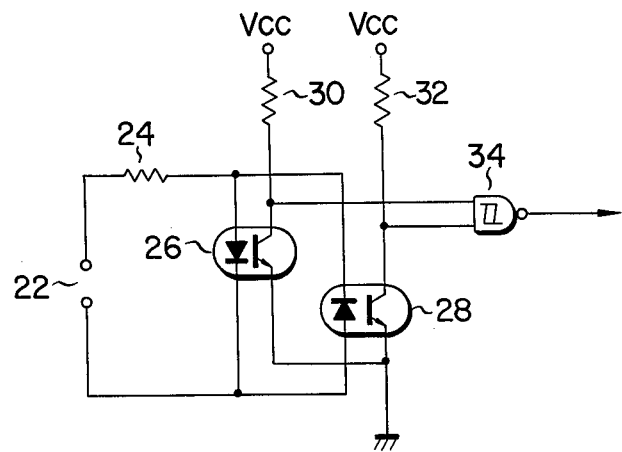
FIG. 2 is a circuit diagram showing the zerocross detector shown in FIG. 1.
Figure 3:
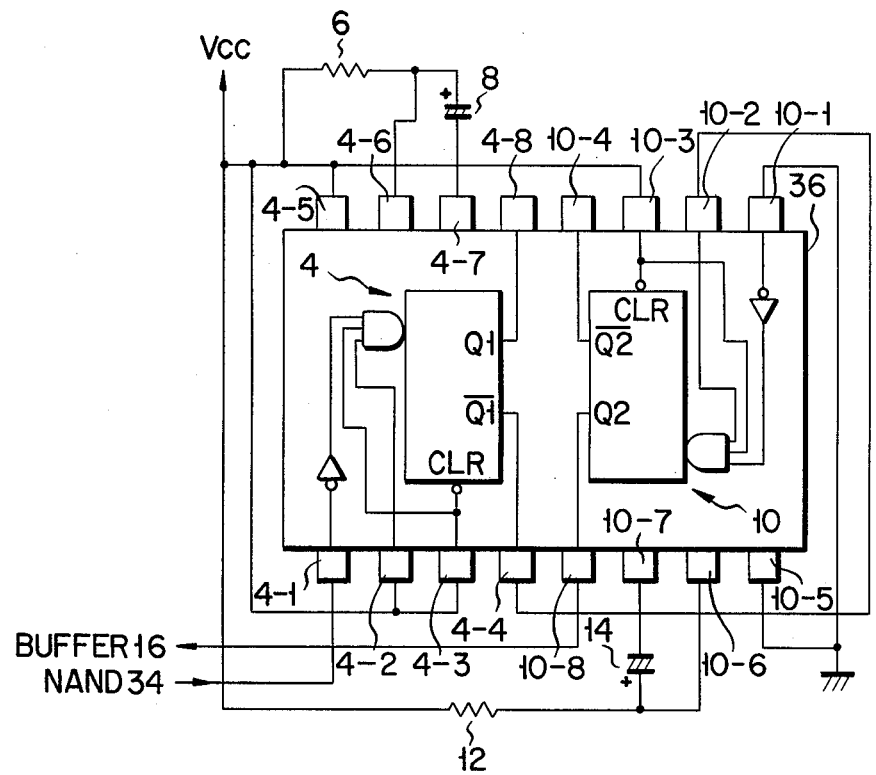
FIG. 3 is a circuit diagram showing the retriggerable monomultivibrators shown in FIG. 1.

More specifically, said zerocross detection circuit 2 and said first and second retriggerable monomultivibrators 4, 10 are constructed as shown in FIGS. 2 and 3. In the zerocross detection circuit shown in FIG. 2, a light emitting diode of a first photocoupler 26 is connected through a resistor 24 to input terminals 22 to which an alternating power source is to be connected. To this light emitting diode, a light emitting diode of a second photocoupler 28 is connected in the form of an antiparallel connection. The first and second photocouplers 26, 28 have their phototransistors connected between the power source $V_{CC}$ and ground or earth, the collectors of said phototransistors being connected to input terminals of a NAND gate 34, respectively.

As shown in FIG. 3, the first and second retriggerable monomultivibrators 4, 10 use a widely applicable IC 36 such as 74 LSI 23 manufactured by Texas Instruments. In the IC 36, the output terminal of the NAND gate 34 is connected to a first terminal 4-1 of the first retriggerable monomultivibrator, a second terminal 4-2. A third terminal 4-3 and a fifth terminal 4-5 are each connected to the power source $V_{CC}$. A sixth terminal 4-6 is connected to the power source $V_{CC}$ through a first resistor 6 and a seventh terminal 4-7 is connected also to the power source $V_{CC}$ through said first capacitor 8 and said first resistor 6. The first capacitor 8 and resistor 6, as stated before, serve to determine the time constant of the first retriggerable monomultivibrator 4, namely the pulse width of a pulse generated by the first retriggerable monomultivibrator 4, the pulse width being set to have a value substantially equal to a half cycle of a reference frequency signal. An eigth terminal 4-8 is left open, and a fourth terminal 4-4 is connected to a second terminal 10-2 for the second retriggerable monomultivibrator. First and fifth terminals 10-1, 10-5 are grounded, while a third terminal 10-3 is connected to the power source $V_{CC}$. A sixth terminal 10-6 is connected to the power source $V_{CC}$ through the second resistor 12, while a seventh terminal 10-7 is connected to the power source $V_{CC}$ through the second capacitor 14 and the second resistor 12. The second 14 and resistor 12 serve to determine the pulse width of a pulse generated by said second retriggerable monomultivibrator 10, said pulse width being set to have a value greater than a substantially half cycle of a certain power source frequency to be compared. A fourth terminal 10-4 is left open, while an eighth terminal 10-8 is connected, as an output terminal, to the buffer 16.

Figure 4:
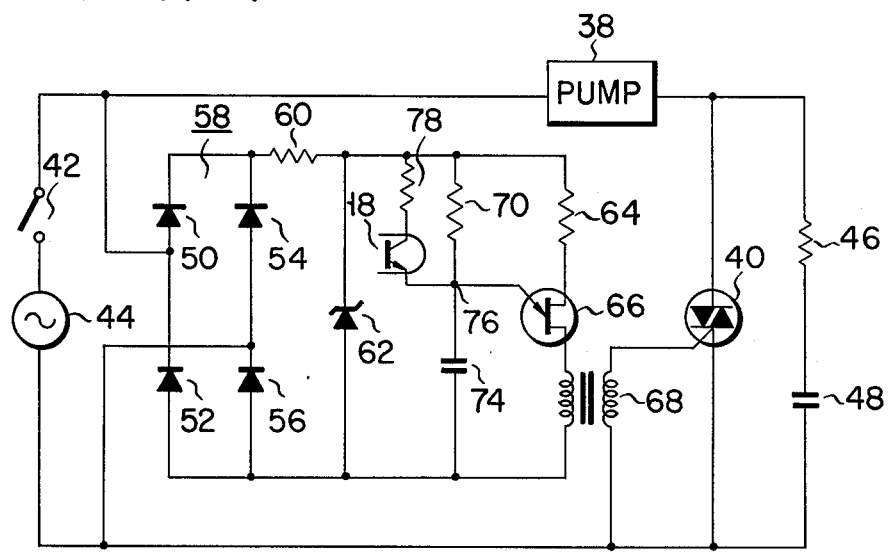
FIG. 4 is a circuit diagram showing the pump drive circuit according to the embodiment of the invention.

FIG. 4 shows a pump drive circuit for providing phase control of the power source voltage applied to a pump 38, in accordance with the output from the power source frequency discrimination circuit shown in FIG. 1. The pump 38 is connected to an alternating power source 44 through a triac 40 and a power source switch 42. To the triac 40, there is connected in parallel a series circuit comprised of a resistor 46 and a capacitor 48 to form a snubber circuit. Connected to the alternating power source 44 through the power source switch 42 is a rectifier circuit 58 formed of diodes 50, 52, 54 and 56. To the rectifier circuit 58, a zener diode 62 for constant voltage is connected through a resistor 60. Connected also to the rectifier circuit 58 is a series circuit of a resistor 64, a UJT 66 and a primary winding side of a pulse transformer 68. A secondary winding side of pulse transformer 68 is connected between the gate and terminal of the triac 40. A trigger electrode of the UJT. 66 is connected to a connection point 76 of a series circuit of a charging resistor 70 and capacitor 74 connected to the rectifier circuit 58. To the charging resistor 70, there are connected a charging resistor 78 and the phototransistor of the photocoupler 18.

Figure 5A:
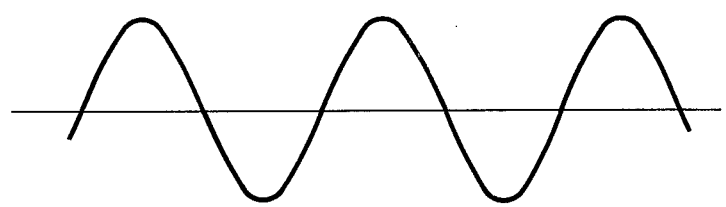
FIGS. 5A to 5J are time charts showing the signals generated from the zerocross detector shown in FIG. 2.
Figure 5B:
Figure 5C:
Figure 5D:
Figure 5E:
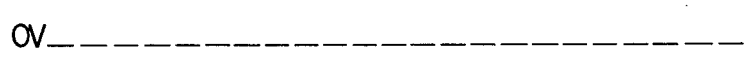

In the pump drive circuit equipped with the above-mentioned frequency discrimination circuit, when the power source switch 42 is closed, an alternating voltage is supplied to the zerocross detector 2 and rectifier circuit 58. When an alternating voltage shown in FIG. 5A is supplied to the input terminals 22 of the zerocross detector from the alternating power source, the light emitting diode of the first photocoupler 26 is energized to emit light for each positive half-cycle period, and during this light emitting period the phototransistor of the photocoupler 26 is rendered conductive. In each subsequent negative half-cycle period, the light emitting diode of the second photocoupler 28 is energized to emit light, with the result that its phototransistor is rendered conductive. Accordingly, the two input terminals of NAND gate 34 are alternatingly grounded with the result that the output terminal thereof has a high level. However, the light emission from the light emitting diode is not instantaneously effected upon a zerocross point of the alternating voltage signal but is effected after this signal has a certain level. The light emitting diodes of the two photocouplers 26, 28, therefore, have a non-emission period in the region of the zerocross point of the alternating voltage signal, and during this non-emission period the two input terminals of the NAND gate 34 are simultaneously kept at a high level, while the output terminal thereof is at a low level. Accordingly, a zerocross pulse shown in FIG. 5B which has a low level in the region of the zerocross point is generated from the output terminal of the NAND gate 34. When the zerocross pulse is supplied to the first terminal of the first retriggerable monomultivibrator 4, the monomultivibrator 4 is triggered upon the fall of the zerocross pulse. Where the power source frequency is lower than the reference frequency, the half cycle period of the former is longer than that of the latter, with the result that the interval at which the zerocross pulse falls is larger than the width of the pulse generated from the first retriggerable monomultivibrator 4. Therefore, a pulse shown in FIG. 5C is generated from the first retriggerable monomultivibrator 4, and through inversion of this pulse a pulse shown in FIG. 5D is generated from the fourth terminal 4-4. When this pulse is supplied to the first terminal 10-1 of the second retriggerable monomultivibrator 10, this monomultivibrator 10 is triggered. In this case, however, since the pulse width of the pulse generated from the second retriggerable monomultivibrator 10 is longer than the half-cycle period of the power source frequency, triggering the second retriggerable monomultivibrator 10 by the pulse shown in FIG. 5D which falls in each substantially half cycle period of the source frequency signal causes the output therefrom to be kept at a high level at all times as shown in FIG. 5E. This high level signal is supplied to the buffer 16 from the eighth terminal of the second retriggerable monomultivibrator 10.

Figure 5F:
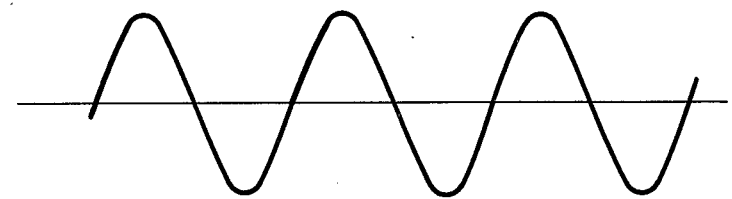
Figure 5G:
Figure 5H:
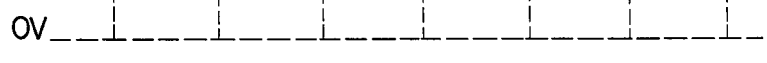
Figure 5I:
Figure 5J:

Next, as shown in FIG. 5F, when an alternating voltage signal having a source frequency higher than the reference frequency is supplied to the input terminals 22 of the zerocross detector 2, a zerocross pulse signal shown in FIG. 5G is generated from the NAND gate 34, with the result that the first retriggerable monomultivibrator 4 is triggered. Since the interval at which the zerocross pulse falls is shorter than the half cycle of the reference frequency signal, the first retriggerable monomultivibrator 4 is sequentially triggered before the pulse generated therefrom falls, whereby a high level signal shown in FIG. 5H is generated from the monomultivibrator 4. This high level signal is inverted with the result that a low level signal shown in FIG. 5I is supplied to the second retriggerable monomultivibrator 10. Accordingly, the second retriggerable monomultivibrator 10 is not triggered with the result that a low level signal shown in FIG. 5J is supplied to the buffer 16 from the eighth terminal 10-8.

Figure 6:
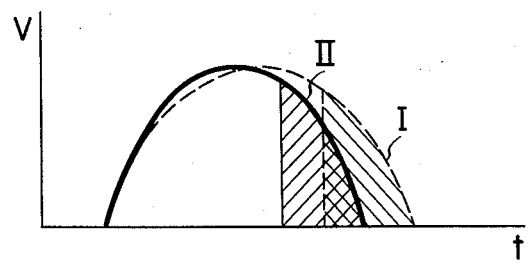
FIG. 6 shows a half cycle of the waveform of an alternating voltage signal placed under phase control.

If the reference frequency is set to have a value between 50 Hz and 60 Hz, discrimination can be made such that when a high level signal is obtained, the power source frequency is 50 Hz and when a low level signal is obtained, the power source frequency is 60 Hz. That is, assuming now that the alternating voltage shown in FIG. 5A has a frequency of 50 Hz, then the zerocross detector 2 generates the zerocross pulse shown in FIG. 5B in response to the frequency signal of 50 Hz, and the first retriggerable monomultivibrator 4 is triggered by the fall of the zerocross pulse occurring in each substantially half cycle period of the 50 Hz frequency signal. Accordingly the pulse shown in FIG. is generated which has a pulse width shorter than the half cycle of the 50 Hz frequency signal and larger than the half cycle period of the 60 Hz frequency signal. This output pulse is inverted as shown in FIG. 5D and the resultant inverted output signal is supplied to the second retriggerable monomultivibrator 10. The monomultivibrator 10 is triggered upon the fall of the pulse occurring in each substantially half cycle period of the 50 Hz frequency signal and in addition the pulse width of the output pulse from the monomultivibrator 10 is larger than the half cycle of the 50 Hz frequency signal. As a result, the output terminal Q2 thereof is kept at a high level as shown in FIG. 5E. Accordingly, the light emitting diode of the photocoupler 18 is kept in a state of non-emission, the capacitor 74 of the pump drive circuit shown in FIG. 4 is charged through the resistor 70 with the result that the capacitor 74 has a specified voltage at a time determined by the resistance value of the resistor 70, the UJT 66 is rendered conductive each time said specified voltage is reached, the triac 40 is thereby triggered through the pulse transformer 68, the pump 38 is applied with the alternating voltage signal having such a specified phase as shown in FIG. 6 by a broken line I, and thus, the pump 38 is driven.

Next, assuming now that the alternating voltage shown in FIG. 5F has a frequency of 60 Hz and that this voltage signal is supplied to the zerocross detector 2, then the zerocross detector 2 generates the zerocross pulse shown in FIG. 5G substantially in each half cycle period of the 60 Hz frequency signal, and the first retriggerable monomultivibrator 4 is triggered upon the fall of the zerocross pulse. Since the interval at which the zerocross pulse is made to fall is shorter than the pulse width of the pulse outputted from the first retriggerable monomultivibrator 4, the monomultivibrator 4 generates the high level signal shown in FIG. 5H and the low level signal shown in FIG. 5J is supplied from its inversion output terminal $\overline{Q1}$ to the second retriggerable monomultivibrator 10. Accordingly, the second retriggerable monomultivibrator 10 is not triggered with the result that its output terminal Q2 is kept at a low level as shown in FIG. 5I. This causes emission of light from the light emitting diode of the photocoupler 18 to render the phototransistor thereof conductive, with the result that the capacitor 74 is charged through the parallel circuit consisting of the resistors 70 and 78. Where the source frequency is 60 Hz, the capacitor 74 attains a specified voltage level in a period of time shorter than where the source frequency is 50 Hz, with the result that the UJT 66 and triac 40 are rendered conductive. Thus, the pump 38 is supplied with such a voltage as shown in FIG. 6 by a solid line II. By suitably selecting the resistance values of the resistors 70 and 78, it becomes possible, as shown in FIG. 6 by oblique lines, to keep the power supplied to the pump 38 to be always constant independent of the frequency level and to maintain an equal level of pump output at a frequency of 50 Hz or 60 Hz.

Note that although in FIG. 4 only one pair of charging resistors 70 and 78 for use in phase control are provided, it will be seen that a suitable number of resistors can be provided in accordance with the phase to be controlled.

Figure 7:
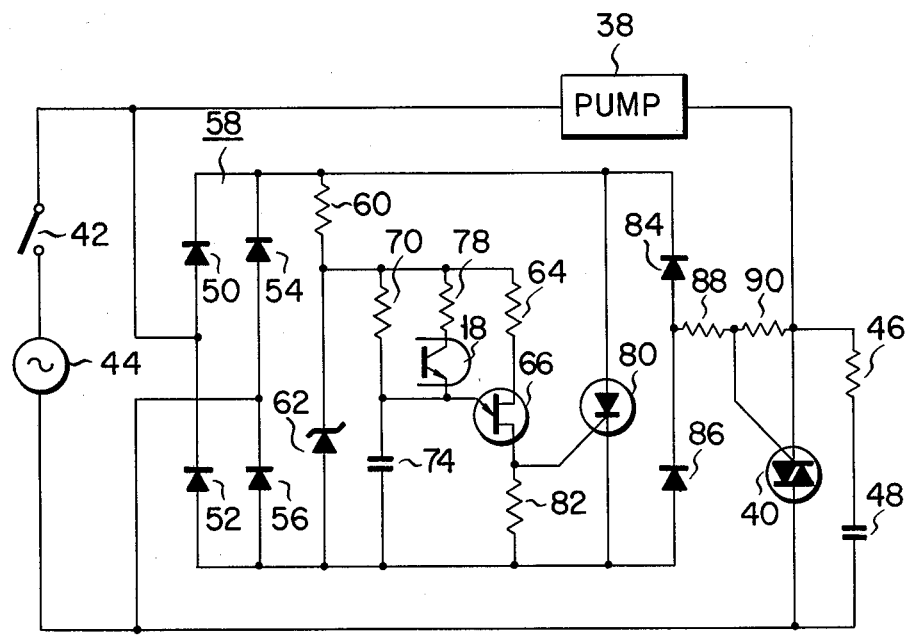
FIGS. 7 and 8 show the pump drive circuit according to another embodiment of the invention.

FIG. 7 shows a modification of the pump drive circuit of the embodiment shown in FIG. 4, in which a gate current is supplied to the triac 40 through an SCR 80 for the purpose of preventing erroneous operation from occurring at the time of applying an inductive load. That is, in this modified pump drive circuit, UJT 66 is connected to the rectifier circuit 58 through a resistor 82, and the SCR 80 having a gate connected to a connection point between the UJT 66 and the resistor 82 is connected to the rectifier circuit 58, and a series circuit consisting of diodes 84 and 86 is connected in parallel to the SCR 80. Between a connection point of the diodes 84 and 86, and the resistor 46, there is connected a series circuit of resistors 88 and 90, to a connection point between which there is connected the gate of the triac 40.

In this modification, the SCR 80 is rendered conductive upon receipt of a trigger pulse generated from the UJT 66. In the positive half cycle of the alternating voltage, the gate current of the triac 40 is allowed to flow through the gate of the triac 40, resistor 88, diode 84, SCR 80 and diode 56, and in the negative half cycle thereof to flow through the diode 54, SCR 80, diode 86, resistor 88 and the gate of the triac 40. In this way, during the conduction of the SCR 80 a trigger current is at all times supplied to the triac 40, thereby preventing an erroneous operation from occurring at the time of applying an inductive load.

Figure 8:
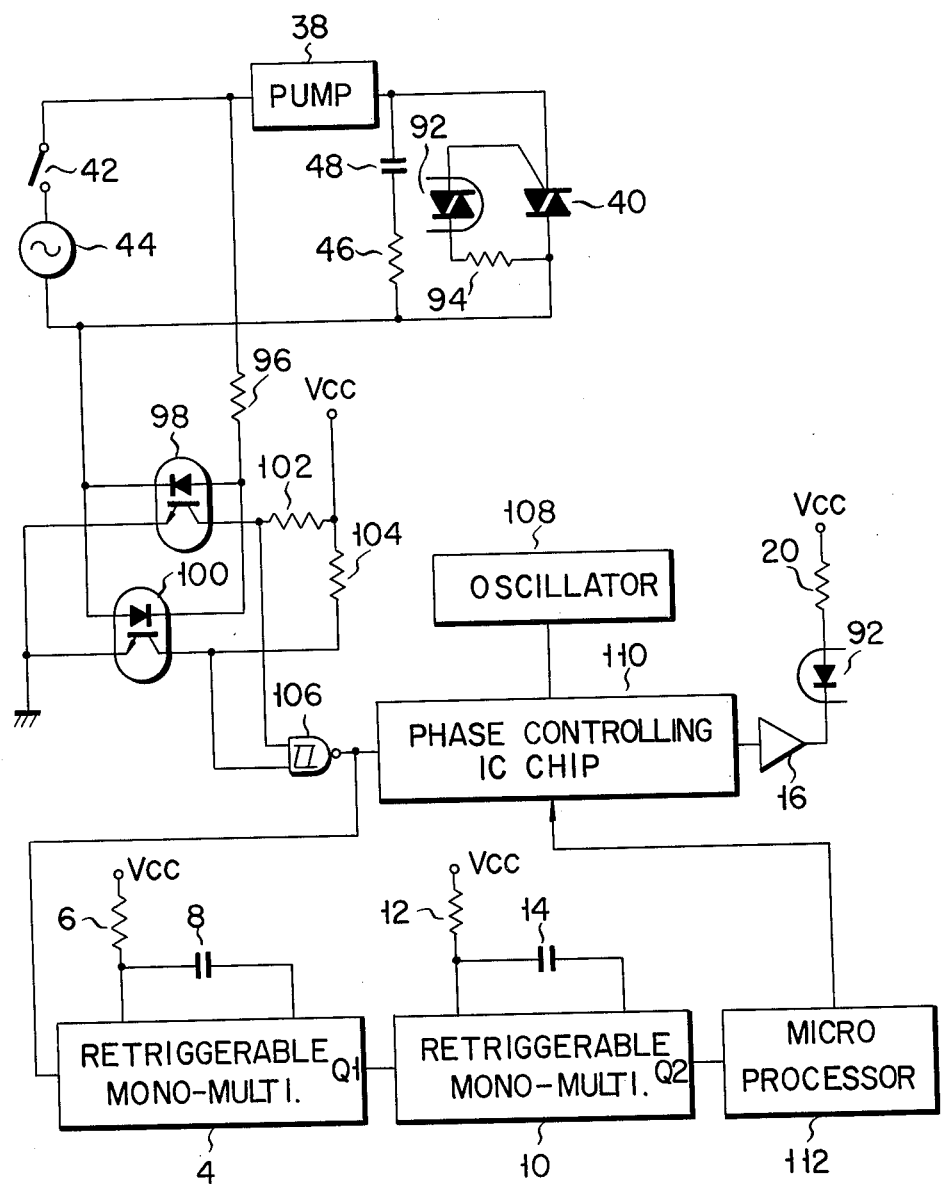

FIG. 8 shows the pump drive circuit according to another embodiment of the invention. In this embodiment, the pump 38 and the triac 40 are connected to the alternating power source 44 through the power source switch 42. Between the gate and terminal of the triac 40 there are connected a phototriac of a photocoupler 92 and a resistor 94. To the triac 40, there is connected a series circuit consisting of the resistor 46 and capacitor 48 to serve as a snubber circuit. In this modification, to the alternating current source 44, there is connected a light emitting diode of a first photocoupler 98 through the power switch 42 and a resistor 96, to which light emitting diode there is connected a light emitting diode of a second photocoupler 100 in the form of an antiparallel connection. Phototransistors of the first and second photocouplers 98, 100 are connected to the power source $V_{CC}$ through resistors 102, 104, respectively, and also grounded. A first connection point between a phototransistor of the first photocoupler 98 and a resistor 102, and a second connection point between a phototransistor of the second photocoupler 100 and a resistor 104 are connected to input terminals of a NAND gate 106. An output terminal of the NAND gate 106 is connected to the first retriggerable monomultivibrator 4 mentioned above and is also connected to a phase controlling IC 110 driven by an oscillator 108. The first retriggerable monomultivibrator 4 is connected to a microprocessor 112 through the above-mentioned second retriggerable monomultivibrator 10, which microprocessor 112 is connected to IC 110 so as to control the same. The phase controlling IC 110 is connected to an anode of the light emitting diode of the photocoupler 92 through the buffer 16 of open collector type. A cathode of this light emitting diode is connected to the power source $V_{CC}$ through the resistor 20.

Figure 9A:
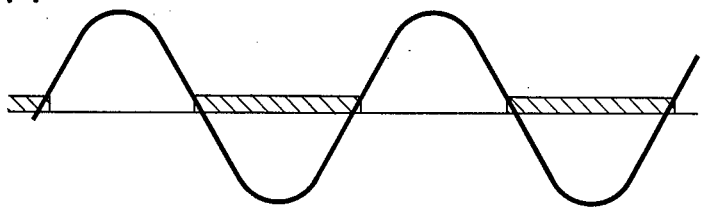
FIGS. 9A to 9C are time charts showing the signals generated from the zerocross detector shown in FIG. 8.
Figure 9B:
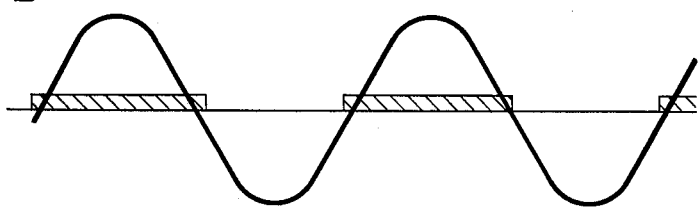
Figure 9C:

According to the embodiment of FIG. 8, the collector voltages of the phototransistors of the first and second photocouplers 98, 100 are increased as shown in FIGS. 9A and 9B by oblique lines, with the result that a negative zerocross pulse shown in FIG. 9C is generated from the NAND gate 106. The first and second retriggerable monomultivibrators 4, 10, as stated before, in accordance with this zerocross pulse, supply a high level signal in the case of a 50 Hz frequency, and a low level signal in the case of a 60 Hz frequency, to the microprocessor 112. The microprocessor 112, as later described, controls the phase controlling IC 110, which, when the alternating voltage begins to acquire a suitable phase, generates a low level signal to energize the photocoupler 92, thereby rendering the triac 40 conductive. As previously stated, therefore, it becomes possible to always keep the output of the pump 38 at a set value regardless of the source frequency level.

FIG. 10 graphically shows the relation between the power supply or input value to the pump 38, and the discharge pressure from the pump 38, curve III indicating a case where the source frequency is 50 Hz, and curve IV indicating a case where the source frequency is 60 Hz. In this graphic diagram, the input value 100 corresponds to the driving of the pump 38 at full power. It will be seen from a comparison between the curves III and IV that, in this case, the discharge pressure achieved by application of the 60 Hz frequency signal is approximately 1.7 times as high as that achieved by application of the 50 Hz frequency signal. When three set values A, B and C are selected from said characteristic curves, a table as shown below is obtained.

|   | 50 Hz | 60 Hz |
|---|-------|-------|
| A | 49    | 35    |
| B | 21    | 13    |
| C | 07    | 04    |

Figure 11:
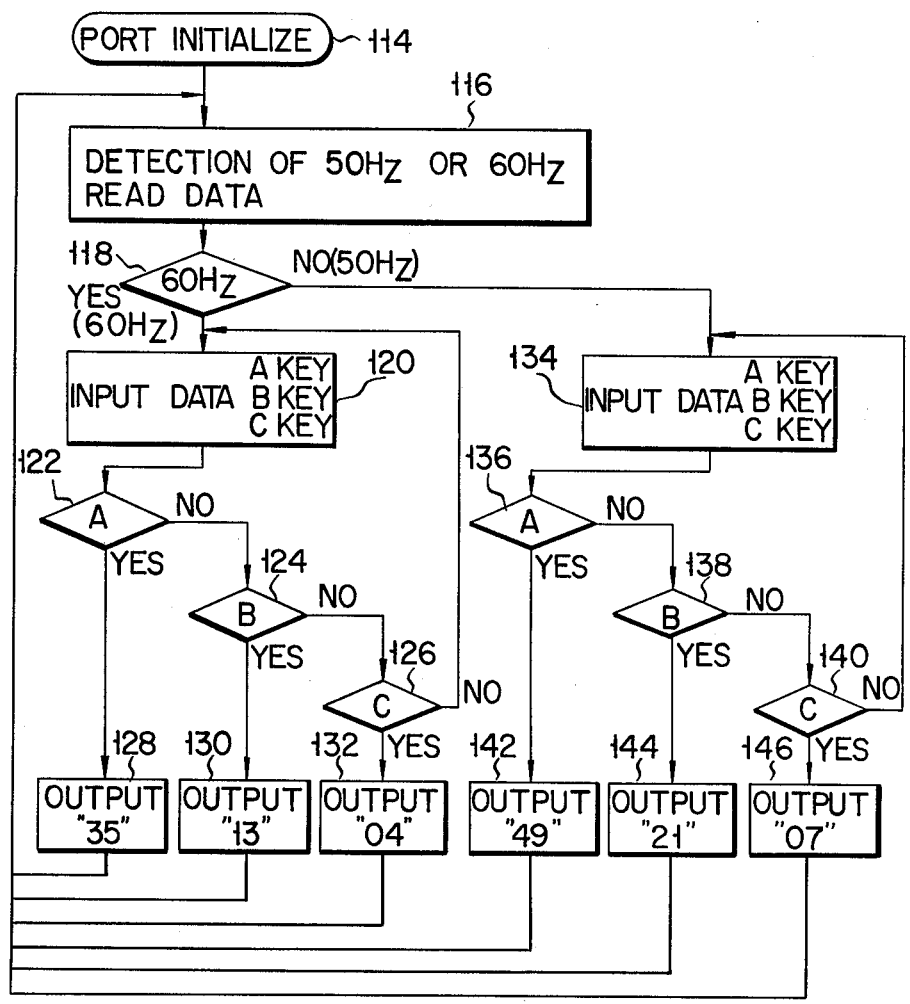
FIG. 11 is a flow chart showing the operation of the microprocessor shown in FIG. 8.

In the table above, the input value A corresponds to a discharge pressure of 0.35 Kg/cm$^2$, and the input values B and C correspond to discharge pressures of 0.2 Kg/cm$^2$ and 0.1 Kg/cm$^2$, respectively.

Where the microprocessor 112 controls the phase controlling IC 110 in accordance with the set values A, B and C, it operates in accordance with the flow chart shown in FIG. 11. That is, the input/output port is first initialized as indicated by reference numeral 114. Next, as indicated by numeral 116, data reading is effected from the second retriggerable monomultivibrator 10 to judge which power source frequency of 50 Hz or 60 Hz is used. If the source frequency is 60 Hz as indicated by numeral 118, the input values A, B and C are selected, as in 122, 124 and 126, in accordance with the keys externally inputted as indicated by numeral 120. The outputs are selected as indicated by numerals 128, 130 and 132, and the data corresponding to those outputs are applied to IC 110. If the source frequency is not 60 Hz, the outputs shown by numerals 142, 144 and 146 are selected in accordance with the keys externally inputted as indicated by numerals 118, 134, 136, 138 and 140, and the data corresponding to those outputs are applied to IC 110. Accordingly, the phase controlling IC 110 generates the output signals shown in FIG. 12 in accordance with the source frequency and input values. During the period in which the output signal shown in FIG. 12 has a low level, the triac 40 is rendered conductive at the phase angle corresponding to those output signals.

Figures 12, 13:
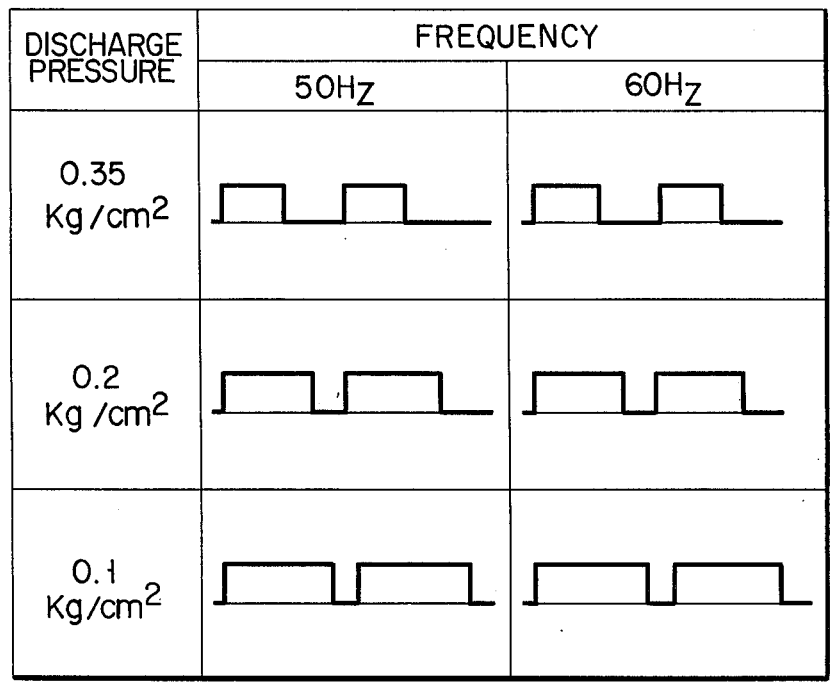
FIG. 12 is a table showing the relation between the phasecontrolled alternating current, frequency, and pump output.
FIG. 13 is a table showing the relation between the pump outputs as set and the pump outputs as actually measured.

FIG. 13 shows the data of actual measured values obtained, with respect to the set values, by using the embodiment shown in FIG. 8. As will be apparent from the Figure, the actual measured values are approximate to the set values constituting predetermined values. This indicates that it is possible to achieve minute control of the pump output.

As described above, according to the pump drive circuit of the invention, the pump output can always be kept at a specified level and also be finely controlled, even when the source frequency is varied.

What is claimed is:

1. A circuit for driving a pump of the type which provides an output level which varies in accordance with the frequency of power source voltage supplied to the pump, wherein the pump output level can be maintained at a desired level notwithstanding the selection of one of two different frequencies of power source voltage, comprising:
    an endoscope pump arranged to develop a flow rate according to the frequency and phase of power source voltage connected to said pump;
    means for supplying a power source voltage having one of two different frequencies;
    means for detecting the zerocross point of the power source voltage to be supplied to the pump and for generating a zerocross pulse signal corresponding to the frequency of the power source voltage;
    means for discriminating the frequency of the power source voltage to be applied to the pump in response to the zerocross pulse signal and for providing a corresponding discrimination signal;
    means for selecting one of at least two different time constants in accordance with the discrimination signal from said discrimination means; and
    means for controlling the phase of the power source voltage to be applied to the pump in accordance with the selected time constant so that a voltage of predetermined phase will be supplied to said pump from said phase control means.

2. A circuit according to claim 1, wherein said discriminating means comprises a first retriggerable monomultivibrator arranged to be triggered in response to the zerocross pulse signal to generate a first discrimination pulse signal having a pulse width equal to a substantially half cycle period of a reference frequency signal, and a second retriggerable monomultivibrator arranged to be triggered in response to said first discrimination pulse signal to generate a second discrimination pulse signal having a pulse width larger than a half cycle period of a lower frequency power source voltage to be supplied to the pump.

3. A circuit according to claim 1, wherein said phase control means includes a triac arranged to be connected between said power source voltage supply means and said pump.

4. A circuit according to claim 3, wherein said selecting means includes a UJT, a series circuit formed of a resistor circuit and a capacitor and connected in parallel to said UJT, a connection point between the resistor circuit and the capacitor being connected to a trigger electrode of said UJT, and a rectifier circuit connected to said series circuit.

5. A circuit according to claim 4, wherein said selecting means operates to select resistance values provided by said resistor circuit.

6. A circuit according to claim 1, wherein said zerocross point detection means includes a photocoupler connected to a power source.

7. A circuit according to claim 6, wherein said zerocross point detection means further includes a logic circuit connected to the photocoupler arranged to be.

8. A circuit according to claim 1, wherein said power source voltage supply means is operative to supply a power source voltage having a frequency selected from one of about 50 Hz and about 60 Hz.

9. A circuit according to claim 2, wherein said power source voltage supply means is operative to supply a power source voltage having a frequency selected from one of about 50 Hz and about 60 Hz, and said reference frequency signal is set in the range of from about 50 Hz to 60 Hz.

* * * * *

UNITED STATES PATENT AND TRADEMARK OFFICE
CERTIFICATE OF CORRECTION

PATENT NO.  : 4,463,269
DATED       : July 31, 1984
INVENTOR(S) : Hiroyuki YASHIMA It is certified that error appears in the above-identified patent and that said Letters Patent is hereby corrected as shown below:

COLUMN 1, last line, change "pump controlled" to --controlled pump--;

COLUMN 2, line 19, change "monomultivibrator" to --mono-multivibrator $\underline{4}$--;

COLUMN 2, line 38, after "terminal" change "$\overline{Q2}$" to --Q2--;

COLUMN 3, line 20, change "The second 14" to --The second capacitor 14--;

UNITED STATES PATENT AND TRADEMARK OFFICE
CERTIFICATE OF CORRECTION

PATENT NO. : 4,463,269

DATED : July 31, 1984

INVENTOR(S) : Hiroyuki YASHIMA

It is certified that error appears in the above-identified patent and that said Letters Patent is hereby corrected as shown below:

COLUMN 5, line 2, change "Accordingly" to --Accordingly,--;
change "FIG." to --FIG. 5c--;

COLUMN 8, (Claim 6), line 55, before "connected to a" insert --arranged to be--;

COLUMN 8, (Claim 7), line 58, after "to the photocoupler" insert --.-- and delete "arranged to be.".

Signed and Sealed this

Twenty-third Day of July 1985

[SEAL]

Attest:

DONALD J. QUIGG

*Attesting Officer*　　*Acting Commissioner of Patents and Trademarks*

UNITED STATES PATENT AND TRADEMARK OFFICE
CERTIFICATE OF CORRECTION

PATENT NO. : 4,463,269

DATED : July 31, 1984

INVENTOR(S) : Hiroyuki YASHIMA

It is certified that error appears in the above-identified patent and that said Letters Patent is hereby corrected as shown below:

COLUMN 2, line 67, after "monomultivibrator", change ", a" to -- . A--; after "4-2", change "." to -- , --;

COLUMN 2, line 68, before "third terminal", change "A"

to --a--;

Signed and Sealed this

Eleventh Day of March 1986

[SEAL]

Attest:

DONALD J. QUIGG

Attesting Officer  Commissioner of Patents and Trademarks